J. A. TRAYLOR.
APPARATUS FOR THICKENING AND SEPARATING SOLIDS FROM LIQUIDS.
APPLICATION FILED SEPT. 21, 1917.
1,299,872.
Patented Apr. 8, 1919.
3 SHEETS—SHEET 1.
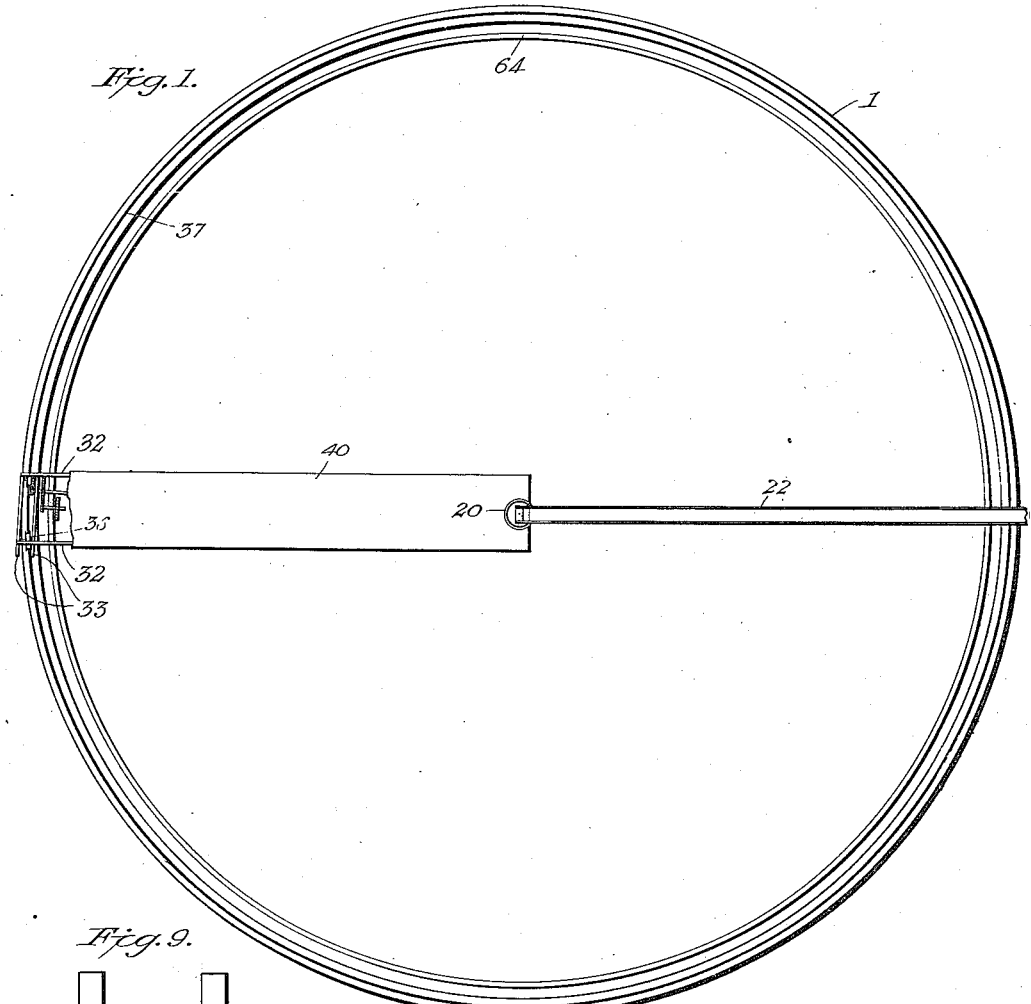
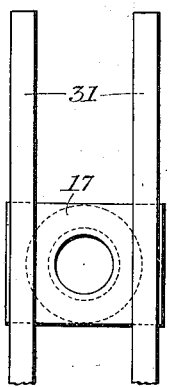
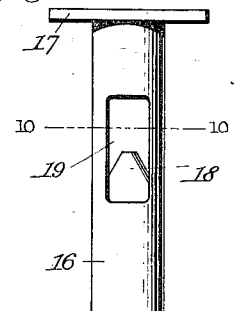
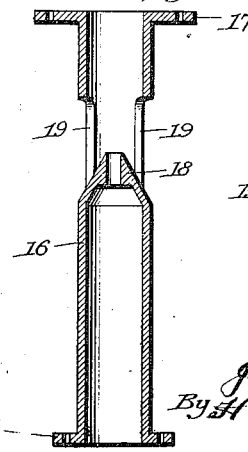
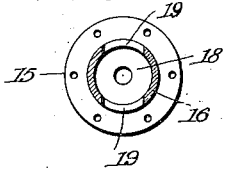
Witnesses:
G. Sargent Elliott
Adella M. Fowle
Inventor:
John A. Traylor.
By H. S. Bailey
Attorney.

J. A. TRAYLOR.
APPARATUS FOR THICKENING AND SEPARATING SOLIDS FROM LIQUIDS.
APPLICATION FILED SEPT. 21, 1917.
1,299,872.
Patented Apr. 8, 1919.
3 SHEETS—SHEET 2.
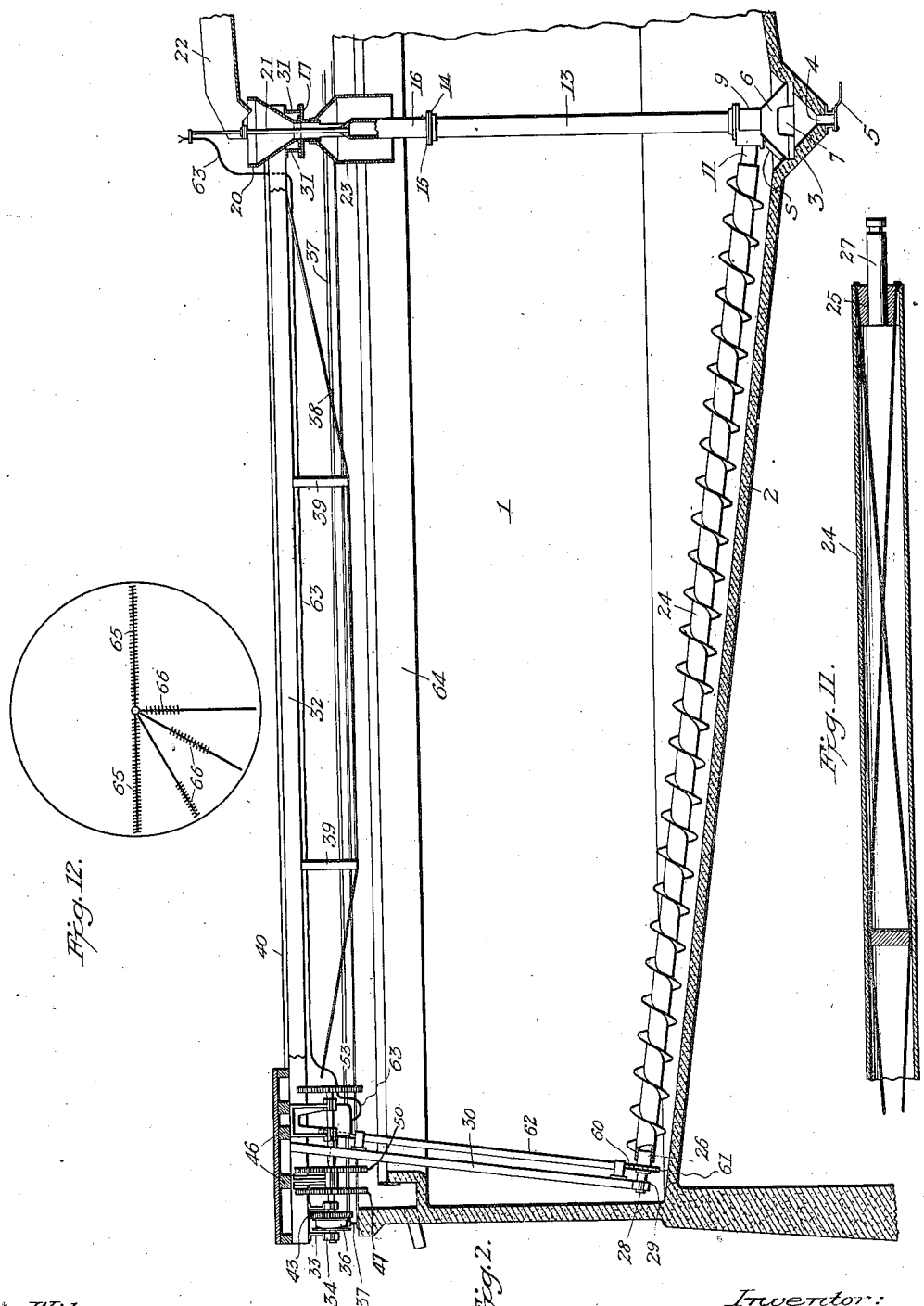

J. A. TRAYLOR.
APPARATUS FOR THICKENING AND SEPARATING SOLIDS FROM LIQUIDS.
APPLICATION FILED SEPT. 21, 1917.
1,299,872.
Patented Apr. 8, 1919.
3 SHEETS—SHEET 3.
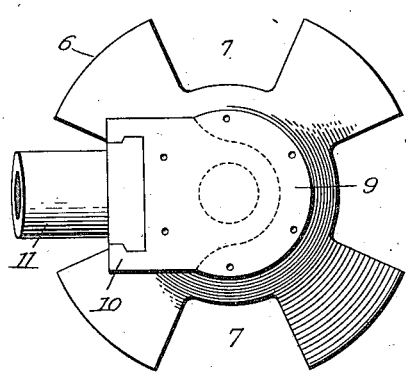
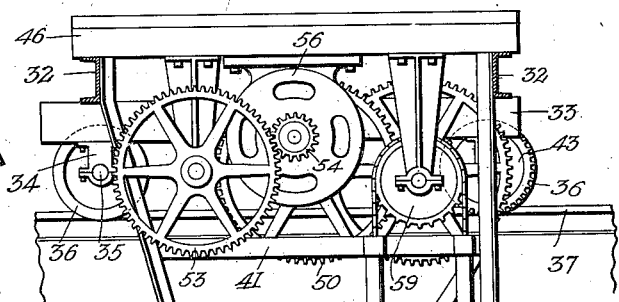
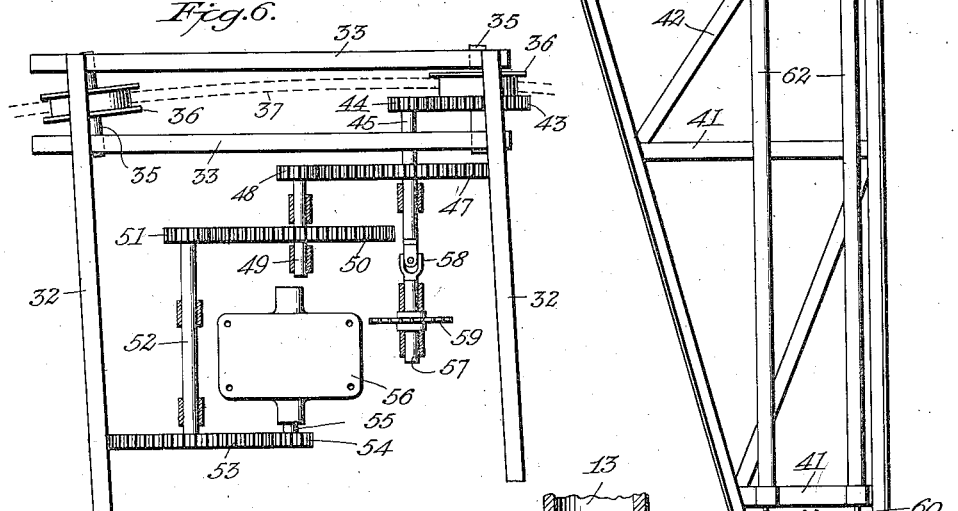
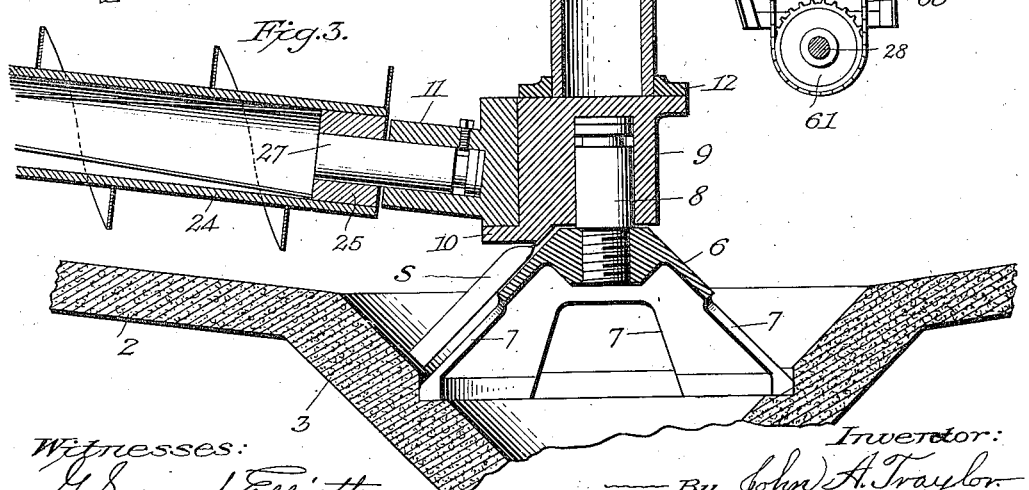

UNITED STATES PATENT OFFICE.

JOHN A. TRAYLOR, OF SALT LAKE CITY, UTAH.

APPARATUS FOR THICKENING AND SEPARATING SOLIDS FROM LIQUIDS.

1,299,872.  Specification of Letters Patent.  Patented Apr. 8, 1919.

Application filed September 21, 1917. Serial No. 192,593.

*To all whom it may concern:*

Be it known that I, JOHN A. TRAYLOR, a citizen of the United States of America, residing at Salt Lake City, county of Salt Lake, and State of Utah, have invented a new and useful Apparatus for Thickening and Separating Solids from Liquids, of which the following is a specification.

This invention relates to apparatus for thickening and separating solids from liquids.

The object of the invention is to provide a tank or container for receiving liquids, such as ore pulp or other liquid substances from which it is desired to thicken and separate the solids held in suspension therein, the said tank being provided with an outlet for the thickened pulp or other substance, an overflow for the clear liquid, and means such as a revoluble worm conveyer for continuously moving the thickened material toward the said outlet, as it settles to the bottom of the tank.

Further, to provide in connection with a tank having a central outlet and an overflow launder, a rotary and revoluble worm conveyer, and means for supporting the same slightly above and parallel with the bottom of the tank, the rotation of the said conveyer on its axis being counter to its revolutions, whereby solids settling to the bottom of the tank are moved continuously toward the outlet, means being provided for supplying pulp or other substances to the tank at its axial center.

These objects are accomplished by the mechanism illustrated in the accompanying drawings, in which:

Figure 1, is a plan view of the improved thickening and separating tank.

Fig. 2, is an enlarged vertical sectional view through one-half of the tank.

Fig. 3, is a greatly enlarged vertical sectional view showing the central portion of the bottom of the tank, the base plate supported thereby and parts carried by the base plate for revolubly supporting the worm conveyer.

Fig. 4, is a plan view of the base plate and parts carried thereby.

Fig. 5, is a front view of the support for the outer end of the worm conveyer, and the mechanism carried thereby for imparting simultaneously a rotary and a revolving movement to the said conveyer.

Fig. 6, is a plan view of the mechanism shown in Fig. 5.

Fig. 7, is a side view of the upper section of the axial shaft, and through which the pulp or other substance is fed to the tank.

Fig. 8, is a vertical, longitudinal sectional view of the same.

Fig. 9, is a plan view thereof showing portions of the bars mounted thereon which support the inner end of a bridge extending from the center to the circumference of the tank.

Fig. 10, is a horizontal sectional view on the line 10—10 of Fig. 7.

Fig. 11, is a longitudinal sectional view through the hollow conveyer shaft showing the manner of trussing the same. And Fig. 12, is a diagrammatic plan view showing a tank provided with two or more worm conveyers.

Similar letters of reference refer to similar parts throughout the several views.

In carrying out my invention, I provide a tank 1, which is circular in form and of any required diameter. The tank is made of any suitable material, preferably reinforced concrete, and its bottom 2 has a slight downward inclination from every point of its circumference toward its center, where it terminates in an axial inverted cone-shaped projection 3, which depends below the surrounding bottom portion of the tank, and is provided with an outlet opening 4, which is provided with a suitable valve or cut-off 5, for controlling the outflow of the thickened product.

Within the cone 3, is seated a base plate 6, in the form of a hollow truncated cone, having openings 7, in its wall through which the thickened material passes to the outlet 4. The upper end or apex portion of the base plate has a threaded opening in which is screwed a stud 8, which forms a pivot upon which is revolubly mounted a block 9, having a socket member 10, in which the base portion of a journal box 11 is mounted, the axis of the said journal box being parallel with the inclination of the bottom of the tank. Upon the top of the block 9, is bolted a collar 12, which surrounds and supports a collar 12, which surrounds and supports a hollow shaft 13, which the lower end of a hollow shaft 13, which terminates a suitable distance from the top of the tank, and a collar or flange 14, is secured to its upper end. To the flange 14 is secured a flange 15, on the lower end of a tubular section 16, which forms a continuation of the shaft and provides an inlet through which liquid material passes to the tank. The upper end of the section 16 terminates in a rectangular plate 17, and intermediate of its length it is formed with an interior conical wall or partition 18, which divides the interior of the tube into two parts. The portion of the tube immediately above the conical partition, is formed with oppositely disposed outlet openings 19, and upon the plate 17 of the said tube is secured a hopper 20.

The partition 18 is formed with an axial hole in which is rigidly mounted the lower end of a rod 21, the upper end of which terminates a slight distance above the hopper 20, and upon the upper end of this rod is suitably swiveled the inner end of a feed launder 22, which supplies material to the hopper whence it passes into the upper portion of the tubular section 16, and out through the openings 19 into the tank.

A hood 23 surrounds the greater portion of the section 16, and this hood terminates at its upper end in a conical portion which is secured to the section 16, as clearly shown in Fig. 2. The hood prevents spreading and splashing of the material, as it flows from the openings 19, and causes it to flow gently down into the tank without unduly agitating the contents thereof. The swivel connection between the rod 21, and the launder 22, permits rotation of the shaft 13 and parts connected therewith, while the launder 22 remains stationary.

The journal box 11 supports the inner end of a worm conveyer 24, which forms the main feature of the present invention. This conveyer comprises a metal pipe in the ends of which are rigidly secured plugs or blocks 25 and 26, in which are rigidly secured stub shafts or journals 27 and 28. The pipe is provided with a left hand spiral conveyer which extends from the inner to the outer end of the same. The stub shaft 27 is journaled in the box 11, which is carried by the rotatable block 9, and the stub shaft 28 is journaled in a bearing 29, on the lower end of a depending frame or bracket 30, which is supported in a manner to be presently described.

Upon the plate 17, on the upper end of the section 16, are secured parallel angle bars 31, and these angle bars support the inner ends of parallel angle bars 32, which extend out over the rim of the tank. To the under side of the outer ends of the bars 32, and substantially at right angles thereto, are secured parallel angle bars 33, near the opposite ends of which are secured axially alined bearings 34, which support short shafts 35, carrying flanged track wheels 36, which rest upon a circular track 37, which is secured upon the rim of the tank. The angle bars 32 are trussed by rods 38, which are secured to the ends of the bars and pass under posts 39, which rest on the truss rod and support the bars 32 intermediate of their length, in the usual manner. The bars 32 support planks 40, and the bars and plank constitute a bridge upon which an attendant can pass to the center of the tank for any purpose.

The frame 30, which supports the outer end of the conveyer, comprises side bars which are connected at intervals by cross bars 41, the frame being strengthened by truss bars 42, as clearly shown in Fig. 5, and the upper ends of the side bars are secured to the bars 32. The advance track wheel 36 has secured on its inner side a gear wheel 43, which meshes with a pinion 44 on one end of a shaft 45, which is supported in bearings secured to the under side of the inner bar 33, and to one of a series of cross bars 46, which are supported upon the forward portions of the bars 32. The shaft 45, also carries a gear wheel 47, which meshes with a pinion 48, on the end of a shaft 49, supported in bearings which are secured to one of the cross bars 46. The shaft 49 also carries a gear wheel 50, which meshes with a pinion 51, on a shaft 52, supported in bearings secured to the cross bars 46, and the inner end of the shaft 52 carries a gear wheel 53, which meshes with a pinion 54, on the shaft 55 of an electric motor 56, which is also secured to the cross bars 46. Thus the motor pinion 54 is connected with the gear 43, on the side of the advance track wheel 36, by a train of gears, which gives the required number of revolutions to the conveyer for a given period of time. Rotary motion is imparted to the conveyer in the following manner:

The shaft 45 is connected to a shaft 57, by a universal coupling 58, and the shaft 57 carries a sprocket wheel 59, which is connected by a chain 60 with a sprocket wheel 61 on the stub shaft 28 of the conveyer, the universal coupling permitting the shaft 57 to lie parallel with the conveyer, while the shaft 45 to which it is coupled is horizontally disposed. Thus, power imparted to the shaft 45 is also imparted through the universal coupling to the shaft 57 and through the chain 60 and sprockets 59 and 61 to the conveyer.

The two laps of the chain 60, between the sprockets, are housed in tubes 62, which are secured to the cross bars 41 of the depending frame 30.

The feed wires 63 leading to the motor may be connected in any preferred way that will permit them to revolve around the tank, with the motor. They are, however, illustrated as extending back to an extension of the rod 21, from which point they may be connected with a power source in any suitable manner, that will permit them to revolve with the motor, this feature not being illustrated as it forms no part of my invention.

The tank is provided at a suitable level with a circular launder 64, which is formed on the inner face of the wall thereof, and which receives the overflow from the tank, and the overflow is carried from the launder to waste, if it is only clear water, and to any suitable receptacle if the water carries values in solution according to the nature of the substance fed to the tank.

A scraper S, is secured to the block 9 and extends over and close to the face of the base plate 6, in position to remove any material adhering to the said base block, as the block 9 rotates.

The apparatus herein described may be employed for thickening and separating the solids from liquids in any material, where the solids are held in suspension in the liquid. Where ore pulp is fed to the apparatus, the overflow, when it contains values in solution, is conveyed to a receptacle for treatment by any desired process, such as the cyanid process, and the thickened substance is subsequently concentrated or given other suitable treatment for the recovery of the values therein.

In Fig. 11, I have shown a longitudinal section through the conveyer pipe illustrating the manner of trussing the same, and in Fig. 12, is illustrated in diagram a plan view of a modification of the apparatus in which I have shown two full length conveyers, 65, and short conveyers 66, arranged progressively and so as to travel over the whole area between the center and circumference of the tank, the invention contemplating any of the arrangements of the conveyer shown.

In operation, liquid substance, such as ore pulp, or other material from which it is desired to separate the solids from the liquids, is fed from the launder 22 to the feed hopper 20, and passes down into the tubular section 16, and out through the openings 19 therein, to the tank, the hood 23 acting to prevent splashing, as above mentioned. The tank is filled to the level of the overflow launder 64, and the excess is carried off by the said launder. The conveyer is set in motion and is revolved in a direction counter to its rotary movement, and as it is carried around the tank, the thickened material which settles to the bottom of the tank, is continuously moved toward the center of the tank and after passing through the openings 7 in the base plate 6, discharges through the outlet 4, into any suitable receptacle for future treatment.

Having described my invention, what I claim as new and desire to secure by Letters Patent, is:

1. The combination with a screw conveyer, of a base and a block rotatably mounted thereon, a bearing removably mounted in said block in which the inner end of said conveyer is mounted, depending means for supporting the outer end of the conveyer, mechanism carried by the depending means for revolving said conveyer around the base, and means connected with the outer end of the conveyer and operated by said mechanism for rotating said conveyer on its axis simultaneously with its revolutions around the base.

2. The combination with a screw conveyer, of a base, a block rotatably mounted thereon, and a bearing removably mounted in said block for supporting the inner end of the conveyer, a circular track, a depending element mounted on the track for supporting the outer end of the conveyer, power operated mechanism carried by said depending element for revolving said conveyer around the said base, and a chain and sprocket mechanism connected with the outer end of the conveyer and operated by the power-driven mechanism for rotating the conveyer on its axis.

3. The combination with a screw conveyer, of a base, a block pivotally mounted thereon having a vertical standard and a bearing carried by said block for supporting the inner end of the conveyer, a circular track concentric with the axis of the base, a member connected at its inner end to said standard and having wheels on its outer end which rest on said track, a hanger carried by said member for supporting the outer end of the conveyer, power-operated mechanism carried by the hanger and connected with said wheels for revolving the conveyer around the base, and means operated by said mechanism for rotating the conveyer on its axis.

4. The combination with a screw conveyer, a rotatable element for supporting the inner end thereof, a support for the outer end of the conveyer, means carried by the support for revolving the conveyer around the axis of the rotatable element, and means connected with the outer end of the conveyer and operated by the revolving means for rotating the conveyer on its axis in a direction counter to its revolutions.

In testimony whereof I affix my signature in presence of two witnesses.

JOHN A. TRAYLOR.

Witnesses:
G. SARGENT ELLIOTT,
ANNA H. PATTERSON.